May 26, 1970     G. LEHNERT     3,513,732

APPARATUS FOR TRIMMING ELECTRICAL INSULATION

Filed Nov. 25, 1966     2 Sheets-Sheet 1

INVENTOR.
Gunther Lehnert
BY
ATTORNEY

INVENTOR.
Gunther Lehnert
BY
ATTORNEY

United States Patent Office 3,513,732
Patented May 26, 1970

3,513,732
APPARATUS FOR TRIMMING ELECTRICAL
INSULATION
Günther Lehnert, Hannover-Bothfeld, Germany, assignor to Kabel- und Metallwerke Gutehoffnungshutte Aktiengesellschaft, Hannover, Germany, a corporation of Germany
Filed Nov. 25, 1966, Ser. No. 597,063
Claims priority, application Germany, Dec. 3, 1965,
H 57,855
Int. Cl. B23b 5/00
U.S. Cl. 82—20                                    9 Claims

ABSTRACT OF THE DISCLOSURE

This invention relates to apparatus for trimming insulation applied to elongated electrical conductors; and more particularly, concerns apparatus for shaving the outer surface of plastic electrical insulation by means of a rotating conical cutter head as applied to wires, cables and the like.

---

In applying synthetic resin insulation, either in foam or solid form, to electric cables and the like, the outer cylindrical surface of the insulation may be subject to irregularities due to nonuniformity in the application of the insulation to the cable core, particularly when the insulation is produced by a foaming action. This results in variations in the cross sectional configuration of the insulation along the length thereof.

Such irregularities in the cross section of the insulation may be undesirable, and this is particularly the case with communication cables, which must have constant cross section in respect to the insulation covering and the outer surface must be quite smooth. Conventionally, such cables must be reworked to achieve the desired uniformity in the insulation covering.

Thus, it has been suggested that a pair of profiling cutters be used in reworking the insulation covering. However, such cutters, respectively engaging one half the total outer circumference of the insulation, inherently leave projecting diametrically related, longitudinally extending ridges which correspond to the slightly spaced meeting edges of the pair of cutters. Further, the resultant surface exhibits a degree of roughness which requires further reworking to assure a smooth surface, as by applications of heat to the thermoplastic resin. Furthermore, a pair of cutters are required for each diameter size of insulation, making the devices expensive and adding to production costs.

It has also been proposed to drive a pair of profiling cutters which are arranged parallel to the longitudinal axis of the work, through a planetary gear system. This gives rise to a smoother outer surface on the insulation, but such procedure is carried out at relatively low speeds and consequent high production cost. Further, when this type of equipment is used for insulations of different diameters, the construction thereof is quite complicated.

Accordingly, an object of this invention is to provide improved apparatus for trimming or shaving synthetic resin insulation coverings on wires, cables, tubes and the like, to attain a true circular cross section uniform throughout the length thereof.

Another object of this invention is to provide an improved trimming apparatus which will produce extremely smooth outer surfaces on electrical insulation at relatively high production speeds; and for a change in insulation diameter, only a trimming head requires replacement.

A further object of this invention is to provide in apparatus of the character described improved guide means for the insulated conductor as it approaches the trimming means, together with slitting means on the guide means, for facilitating the removal of the trimmed portion of insulation.

Other objects of this invention will in part be obvious and in part hereinafter pointed out.

Figure 1:
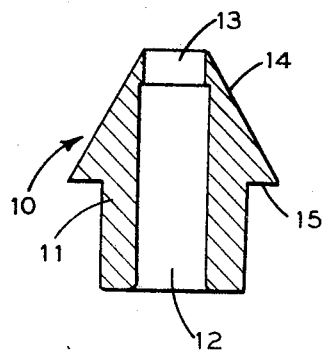
Figure 2:
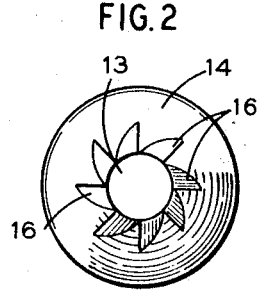
Figure 3:
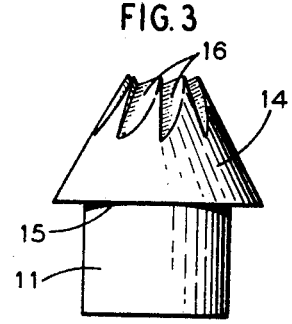
Figure 4:
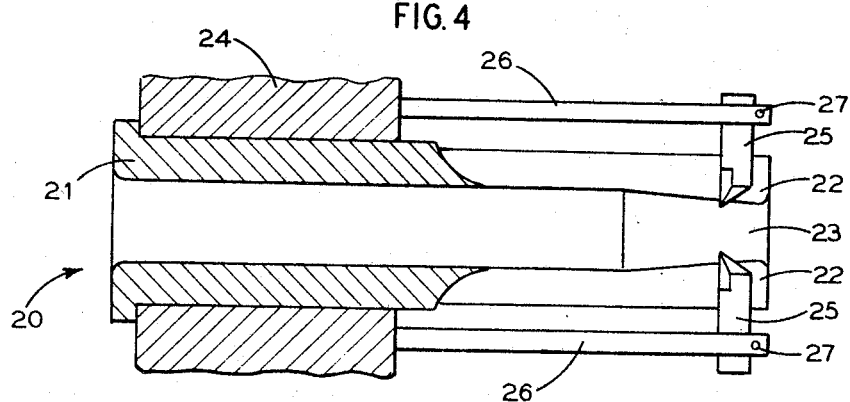
Figure 5:
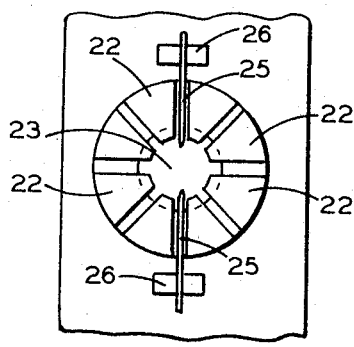
Figure 6:
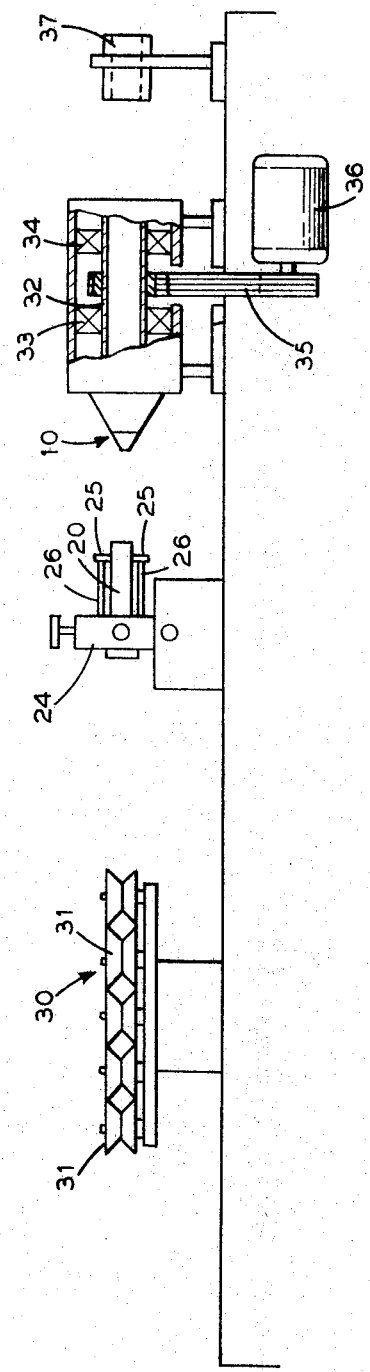

In the drawing, FIG. 1 is a vertical sectional view of a trimming device embodying the invention;
FIG. 2 is a top plan view thereof;
FIG. 3 is a side elevational view thereof;
FIG. 4 is a side elevational view, with parts in section showing of a combination guide and slitting means;
FIG. 5 is an end elevation view thereof; and
FIG. 6 is a side elevational view showing an assembly of means for treating insulated conductor and including embodiments of the instant invention.

Essentially, the trimming apparatus of the instant invention comprises a tubular rotary cutter head having tapered cutting surfaces.

Thus, as shown in FIGS. 1–3, 10 designates a trimming head embodying the invention; the same comprising a tubular member 11 having a bore 12 which terminates at the tip thereof in a short bore portion 13 of reduced diameter. The cutting surface 14 is of conical shape and is preferably at an angle of about 30° forming an annular shoulder 15. The cutting edges 16 on surface 14 are in the form of halved parabolas symmetrically arranged relative to the longitudinal axis of the head 10.

The acute cone angle of the cutting surface 14 is somewhat critical and with angles greater than about 30°, it has been found that the trimmed surface of the insulation covering is somewhat roughened. With an angle more acute than about 30°, the cutting action is less efficient. The cutting edges or teeth 16 should be ground at an angle slightly greater than the final cone angle. Thus, with a cone angle of about 30°, the grinding angle may be about 35°. This is effective to concentrate the cutting action to the tip of the cone, thus avoiding subsequent chipping of the insulation skin.

The diameter of the bore portion 13 is equal to the diameter of the trimmed insulation covering. Bore 12 is slightly larger then the diameter of the bore portion 13, by several tenths of a millimeter. This insures that the trimmed insulation contacts the head 10 only at the tip end thereof, while the head 10 rotates at high speed (about 1600 r.p.m.), thus avoiding friction heating and damage to the freshly trimmed surface of the insulation covering.

While any number of cutting edges or blades 16 may be ground into surface 14 of member 11, it has been found that when operating at high speeds (1600 r.p.m.), it is preferable that the number of blades should be about equal to the number of millimeters measuring the I.D. of the axial bore. A smaller number of blades would require an increase in operational speed which in turn leads to an undesirable increase in friction heat. The trimming head 10 may be used with the member carrying the covering to be trimmed, advancing at a speed of the order of from about 25 to about 50 meters per minute.

The individual blades 16 may take the approximate shape of a parabola, viewing the tip from the forward end thereof. Since it is difficult to grind such shapes into the surface 14, it is advantageous to impart to each blade 16 the shape of a symmetrically split paraboloid with the opening toward the longitudinal axis of the cone. Such surface shape is readily ground and shows excellent cutting properties.

It is desirable to guide the advancing insulated member as the same approaches the trimming head 10. To this end there is provided a guide member generally indicated at 20, FIGS. 4, 5. Wherein the same comprises a tubular portion 21 having mounted on the forward end thereof a series of spring loaded members 22. The members 22 are reinforced at their outer ends and in their normal position describe a bore having a diameter equal to the trimmed outer diameter of the insulation, such bore being generally indicated at 23. Such guide member 20 will take into account the variations in cross section of the insulation, as the same approaches the trimming head 10.

In addition, guide member 20, held in a suitable fixture 24, carries a pair of slitting elements 25 extending radially toward each other and adjustably mounted on supports 26 by screws 27. The elements 25 are located between adjacent members 22 and are so positioned as to cut to a depth just short of the finished outer diameter of the insulation being trimmed. By thus slitting the outer surface of the insulation, the trimmed skin portion may be peeled away and drawn off radially relative to the feed axis of the insulation being trimmed.

It is understood that the trimming head 10 may be mounted in a suitable fixture arranged to be rotated at the desired speed. Thus, as shown in FIG. 6, the wire, cable, tubing or other continuous elongated element carrying a covering of synthetic resin in foam or solid form, as for example polyethylene or other resin, not shown, is adapted to be moved horizontally through straightening means 30 having a series of pulleys rotatable about vertical axes and in offset relation to each other, all in a manner known in the art, to remove any kinks, or bends in the elongated element, the pulleys 31 operating in a known manner to straighten the moving element.

The straightened, continuously moving element then passes through the guide member 20 and slitting elements 25, described above; and thereafter through the trimming head 10. Trimming head 10 may be mounted on a hollow shaft 32 supported for rotation about a horizontal axis by bearings 33, 34. A belt drive 35 connects shaft 32 with an electric motor 36 for rotating head 10 at the desired speed. The trimmed, continuously moving element issuing from the head 10 passes through a supporting guide collar 37; the trimmed element then being reeled or otherwise packaged in its finished form.

As various changes might be made in the disclosed embodiments of the invention without departing from the spirit thereof, it is understood that all matter herein shown or described shall be deemed illustrative and not limiting except as set forth in the appended claims.

What is claimed is:

1. Apparatus for trimming the synthetic resin covering on elongated continuous members to leave said covering with a uniform circular cross section throughout the length thereof, said apparatus comprising a rotatable tubular trimming head having a tubular end and arranged for rotation about the longitudinal axis thereof while passing the covered member axially therethrough, said head having a conical cutting surface extending to said tubular end thereof, said surface being formed with a plurality of cutting edges symmetrically distributed about the tapered opening at said tubular end thereof, and means for rotating said trimming head.

2. Apparatus as in claim 1 wherein said tubular head includes a bore portion opening at the cutting end thereof having a diameter substantially equal to the outside diameter of the trimmed insulation covering, and a rearwardly extending bore portion communicating with said first bore potion and somewhat larger in diameter than that of said first bore portion.

3. Apparatus as in claim 1 wherein said conical surface makes an angle of about 30° with respect to the longitudinal axis of said tubular member.

4. Apparatus as in claim 3 wherein the grinding angle of the cutting edges is about 35° relative to said axis.

5. Apparatus as in claim 1 wherein the number of cutting edges is substantially equal to the I.D. of the bore of said tubular member expressed in millimeters.

6. Apparatus as in claim 1 wherein said cutting edges have the shape of split paraboloids extending toward the tapered opening of said head.

7. Apparatus as in claim 1 and further including guide means in advance of said head, said guide means comprising a plurality of radially disposed spring loaded members forming a passage for passing the conductor carrying the cover of insulation.

8. Apparatus as in claim 7 and further including slitting means on said guide means, said slitting means being adjustably mounted for movement to adjusted radial positions to regulate the depth of cut of said slitting means with respect to the outer surface of the insulation covering.

9. Apparatus as in claim 8 wherein said slitting means is located between adjacent spring loaded guide members.

References Cited

UNITED STATES PATENTS

| 2,233,928 | 3/1941 | Weaver | 29—95.1 XR |
| 2,596,444 | 5/1952 | Siegerist | 82—20 |
| 3,128,658 | 4/1964 | Mitchell et al. | 82—20 |

FOREIGN PATENTS

| 609,591 | 11/1960 | Canada. |
| 1,055,632 | 10/1959 | Germany. |

LEONIDAS VLACHOS, Primary Examiner